(12) United States Patent
Volkov

(10) Patent No.: US 8,893,551 B2
(45) Date of Patent: *Nov. 25, 2014

(54) PLANT BIOSENSOR AND METHOD

(75) Inventor: Alexandre G. Volkov, Huntsville, AL (US)

(73) Assignee: Bioelectrochemistry, LLC, Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,336

(22) Filed: May 23, 2012

(65) Prior Publication Data

US 2012/0227503 A1    Sep. 13, 2012

Related U.S. Application Data

(63) Continuation of application No. 12/362,065, filed on Jan. 29, 2009, now Pat. No. 8,205,502.

(60) Provisional application No. 61/025,180, filed on Jan. 31, 2008.

(51) Int. Cl.
  *G01N 29/00* (2006.01)
  *G01V 1/00* (2006.01)
  *G01V 1/18* (2006.01)

(52) U.S. Cl.
  CPC . *G01V 1/008* (2013.01); *G01V 1/18* (2013.01)
  USPC .................................. 73/649; 73/1.85; 702/15

(58) Field of Classification Search
  USPC .............. 73/649, 1.85, 596, 862.042; 702/15; 367/14, 21
  See application file for complete search history.

(56) References Cited

U.S. PATENT DOCUMENTS

| | | | |
|---|---|---|---|
| 4,328,809 A | 5/1982 | Hirschowitz et al. | |
| H1524 H | 4/1996 | Thompson et al. | |
| 6,462,549 B1 | 10/2002 | Curtis et al. | |
| 7,453,763 B2 | 11/2008 | Johnstad | |
| 7,706,982 B2 * | 4/2010 | Mizrahi | 702/15 |
| 7,823,467 B2 | 11/2010 | Taya et al. | |
| 7,986,587 B2 * | 7/2011 | Duncan et al. | 367/40 |
| 8,055,446 B2 * | 11/2011 | Byerly | 702/6 |
| 8,347,658 B2 * | 1/2013 | Thompson et al. | 70/11 |
| 2009/0198448 A1 | 8/2009 | Volkov | |

OTHER PUBLICATIONS

Alexander G. Volkov et al., "Closing of Venus Flytrap by Electrical Stimulation of Motor Cells," Plant Signalling & Behavior, vol. 2, Issue 3, May/Jun. 2007, Landes Bioscience, pp. 139-144.

Alexander G. Volkov et al., "Kinetics and Mechanism of *Dionaea muscipula* Trap Closing," Plant Physiology, vol. 146, Feb. 2008, American Society of Plant Biologists, pp. 1-9.

Alexander G. Volkov, "Electrophysiology and Phototropism," Communication in Plants, Springer-Verlag Berlin Heidelberg 2006, pp. 351-367.

(Continued)

*Primary Examiner* — J M Saint Surin
(74) *Attorney, Agent, or Firm* — Ann I. Dennen; Lanier Ford Shaver & Payne P.C.

(57) ABSTRACT

A system in accordance with an embodiment of the present disclosure comprises at least two electrodes coupled to an electromagnetically sensitive bio-organism and control logic configured to predict an earthquake based upon signals produced by the electrodes in response to an electromagnetic signal.

15 Claims, 8 Drawing Sheets

(56) References Cited

OTHER PUBLICATIONS

Alexander G. Volkov et al., "Plants as Environmental Biosensors," Plant Signaling & Behavior, vol. 1, Issue 3, May/Jun. 2006, Landes Bioscience, pp. 105-115.

Alexander G. Volkov et al., "Electrical Signaling in Aloe vera induced by localized thermal stress," Bioelectrochemistry 71, 2007, Elsevier B.V., pp. 192-197.

A.G. Volkov et al., "Insect-induced bioelectrochemical signals in potato plants," Bioelectrochemistry and Bioenergetics 37, 1995, Elsevier Science S.A., pp. 55-60.

Alexander G. Volkov et al., "Bioelectrochemical signalling in green plants induced by photosensory systems," Bioelectrochemistry 63, 2004, Elsevier B.V., pp. 91-94.

Anthony Labady Jr. et al., "Plant Bioelectrochemistry: effects of CCCP on electrical signaling in soybean," Bioelectrochemistry 57, 2002, Elsevier Science B.V., pp. 47-53.

John Mwesigwa et al., "Electrochemical signaling in green plants: effects of 2,4-dinitrophenol on variation and action potentials in soybean," Bioelectrochemistry 51, 2000, Elsevier Science S.A., pp. 201-205.

Alexander G. Volkov et al., "Nanodevices in nature: Electrochemical aspects," Electrochimica Acta 52, 2007, Elsevier Ltd., pp. 2905-2912.

Alexander G. Volkov et al., "Phototropism and electrified interfaces in green plants," Electrochmica Acta 50, 2005, Elsevier Ltd., pp. 4241-4247.

Alexander G. Volkov, "Green plants: electrochemical interfaces," Journal of Electroanalytical Chemistry 483, 2000, Elsevier Science S.A., pp. 150-156.

Alexander G. Volkov et al., "Electrochemistry of soybean: effects of uncouplers, pollutants, and pesticides," Journal of Electroanalytical Chemistry 496, 2001, Elsevier Science B.V., pp. 153-157.

Tatiana Shvetsova et al., "Plant electrophysiology: FCCP induces action potentials and excitation waves in soybean," Plant Science 161, 2001, Elsevier Science Ireland Ltd., pp. 901-909.

Tatiana Shvetsova et al., "Soybean electrophysiology: effects of acid rain," Plant Science 162, 2002, Elsevier Science Ireland Ltd., pp. 723-731.

Volkov, Alexander G., "Plant Electrophysiology Theory and Methods," © Springer-Verlag Berlin Heidelberg 2006.

Materials Sciences and Engineering: C2 1995.

* cited by examiner

PLANT BIOSENSOR AND METHOD

CROSS-REFERENCE

This application claims priority to U.S. patent application Ser. No. 12/362,065, entitled "Plant Biosensor and Method," filed on Jan. 29, 2009, which claims priority to U.S. Provisional Patent Application No. 61/025,180, entitled "Plant Biosensor," filed on Jan. 31, 2008, both of which are incorporated herein by reference.

BACKGROUND OF THE INVENTION

An earthquake is the sudden movement of the earth's surface. The goal of the earthquake prediction is to give warning of potentially damaging earthquakes early enough to allow appropriate response to the disaster, enabling people to minimize loss of life and property.

Seismic activity below the earth's surface is difficult to detect but can be critical in predicting earthquakes. When rocks shift below the earth's surface, low-level electromagnetic waves are produced which, when detected, are useful in predicting the time, place, and magnitude of earthquakes. However, scientists have difficulty accurately detecting and analyzing such low-level electromagnetic waves. Electric and magnetic signals have been observed before many geological time events, e.g., volcanic eruptions, in unstable flanks of active volcanoes, landslides, and earthquakes. Here, we focus on the so-called seismic electric signals activities, which consist of hundreds of pulses and are detected several days before major earthquakes in many countries.

Certain green plants, such as *Aloe Vera, Mimosa pudica*, potato plants, tomato plants, and Venus flytraps, are sensitive to electrostatic, magnetic and electromagnetic stimulation due to effects of plant electrotropism and magnetotropism. Thus, there are electrochemical responses by these bio-organisms when a low-level electromagnetic wave is detected. Therefore, there is a need for a system which uses an electromagnetically sensitive bio-organism in conjunction with a computing device for accurately predicting earthquakes by detecting and analyzing electromagnetic waves produced by seismic activity.

SUMMARY

A system in accordance with an embodiment of the present disclosure comprises a plurality of electrodes communicatively coupled to an electromagnetically sensitive bio-organism isolated from electrostatic energy and control logic configured to detect at least one signal from the electrodes and determine, based upon the at least one signal, whether seismic activity is present, the at least one signal indicative of an action potential in the bio-organism.

A method in accordance with an embodiment of the present disclosure comprises detecting at least one signal from a plurality of electrodes communicatively coupled to an electromagnetically-sensitive bio-organism isolated from electrostatic energy, the signals indicative of action potentials in the bio-organism, and determining, based upon the signals, whether seismic activity is present.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DESCRIPTION

Figure 1:
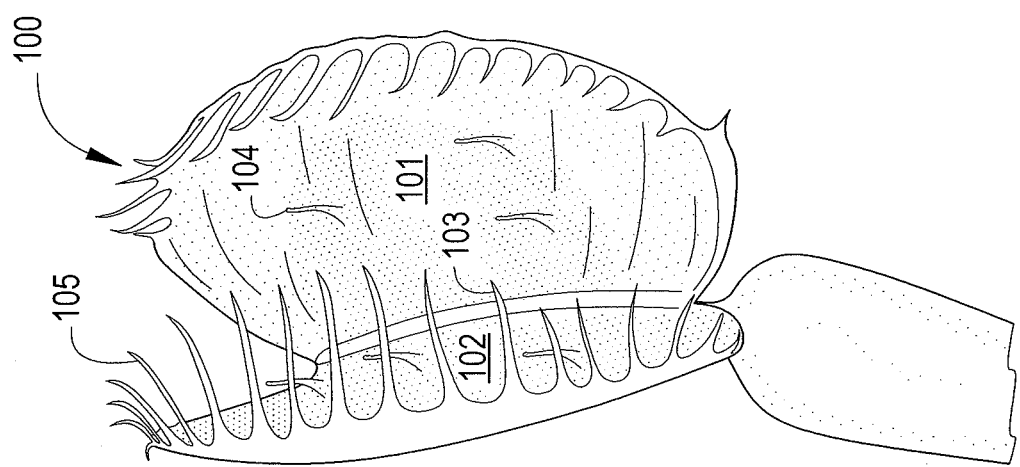
FIG. 1 depicts an electromagnetically sensitive bio-organism.

FIG. 1 depicts an electromagnetically sensitive bio-organism 100, for example a Venus flytrap. The bio-organism 100 comprises two lobes 101, 102, which are hingedly coupled via a midrib 103. The center of each lobe 101, 102 comprise three sensitive trigger hairs 104. Further, the edges of each lobe 101, 102 comprise cilia 105.

When an insect (not shown) is attracted to the bio-organism 100, it lands on one of the lobes 101, 102. When the trigger hairs 104 are touched by the insect, the lobes 101, 102 are mechanically stimulated, and the lobes 101, 102 close on the insect. The cilia 105 form an interlocking wall that keeps the insect captured.

Note that when the trigger hairs 104 are touched, the trigger hairs 104 activate mechanosensitive ion channels (not shown), thereby generating receptor potentials. The receptor potentials produce an action potential in the bio-organism, which causes the lobes 101, 102 to close on the insect.

Figure 2:
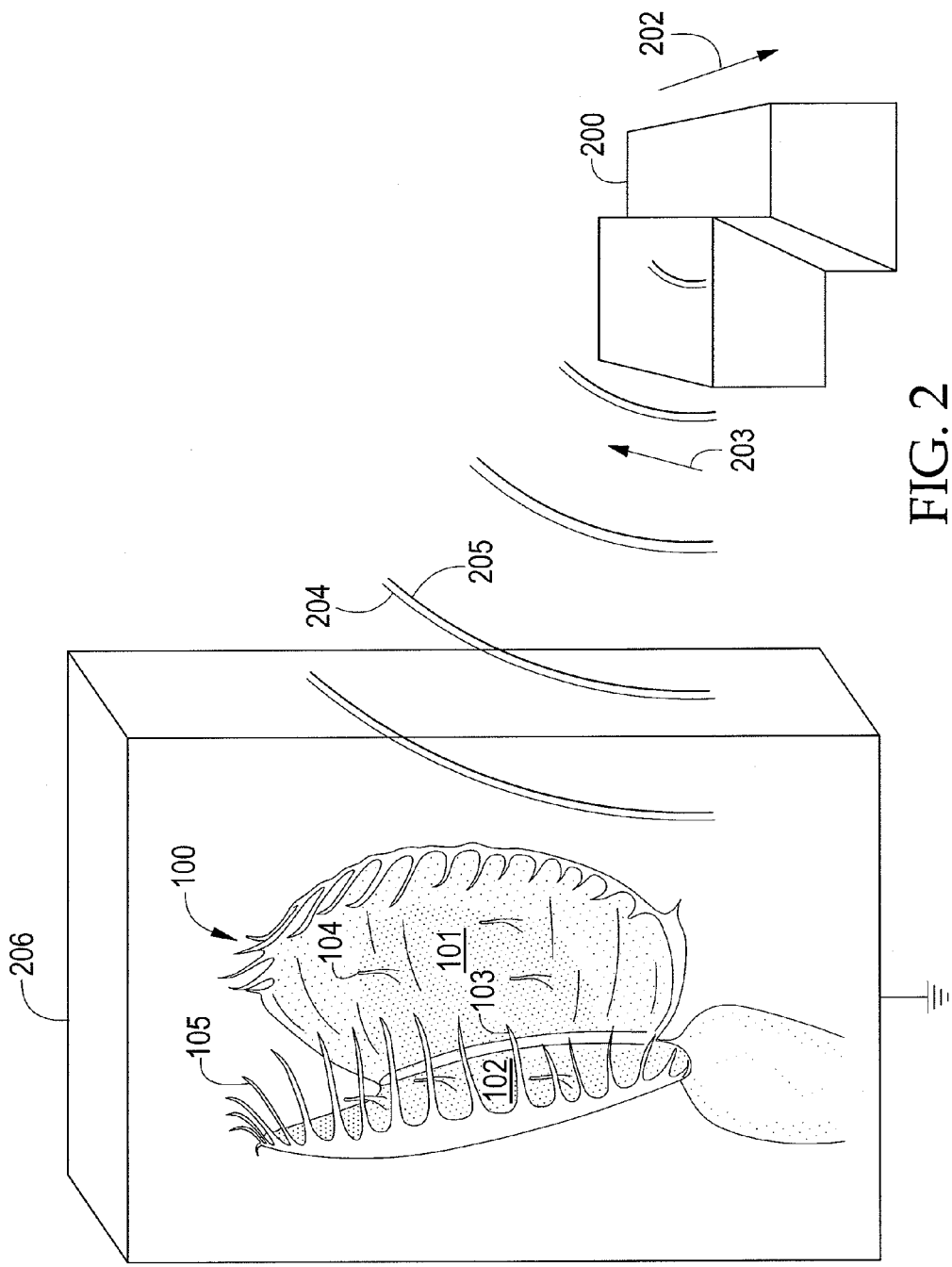
FIG. 2 is the electromagnetically sensitive bio-organism of FIG. 1 encapsulated in a Faraday cage when electromagnetic waves are present.

The action potentials generated in the bio-organism 100 may also be induced by electromagnetic energy, which is described further with reference to FIG. 2. Note that the term "action potential" refers to waves of voltage generated in the cell membrane of the plant when the plant is stimulated.

FIG. 2 depicts a representation of the ground 200 and the electromagnetically sensitive bio-organism 100. The ground 200 is experiencing fracturing and slipping, which oftentimes occurs during an earthquake. As an example, part of the ground may shift in a direction indicated by a reference arrow 202 and another part of the ground may shift in a direction indicated by a reference arrow 203. When such a shift occurs, seismic waves 204 are produced. Seismic waves 204 are essentially mechanical waves.

Note that there are a variety of ways in which the ground can shift, and that the shift shown in FIG. 2 occurs along what is sometimes referred to as a "strike-slip fault," In a strike-slip fault the rocks within the ground 200 move in horizontal directions indicated by arrows 202, 203. There are other types of faults including "normal faults" and "reverse faults," which are contemplated by the present disclosure. The strike-skip fault is shown and described for exemplary purposes only.

Seismic activity below the surface of the earth, such as the shearing of piezoelectric rocks, e.g., crystal, also produce low-level electromagnetic waves 205 prior to an actual shift in the ground 200 that produces the seismic waves 204. These low-level electromagnetic waves 205 are often a precursor to earthquakes. Thus, detection of the electromagnetic waves 205 may be used to predict earthquakes.

The bio-organism 100 is placed in a Faraday cage 206 so that electrostatic energy does not affect the bio-organism 100. Note that a "Faraday cage" refers to an enclosure that is made of a conductive metal and that is grounded. The Faraday cage blocks electric energy from entering the enclosure. However, magnetic energy can still penetrate the enclosure. Thus, the electromagnetic waves 205 generated from seismic activity penetrate the Faraday cage 206. However, electrical energy, for example electrical energy produced by a lightning strike, does not.

As described hereinabove, the bio-organism 100 is sensitive to electromagnetic waves 205. As the electromagnetic waves 205 encounter the bio-organism 100 through the Faraday cage 206, the electromagnetic waves 205 produce action potentials that travel through the lobe 101 to the midrib 103.

Figure 3:
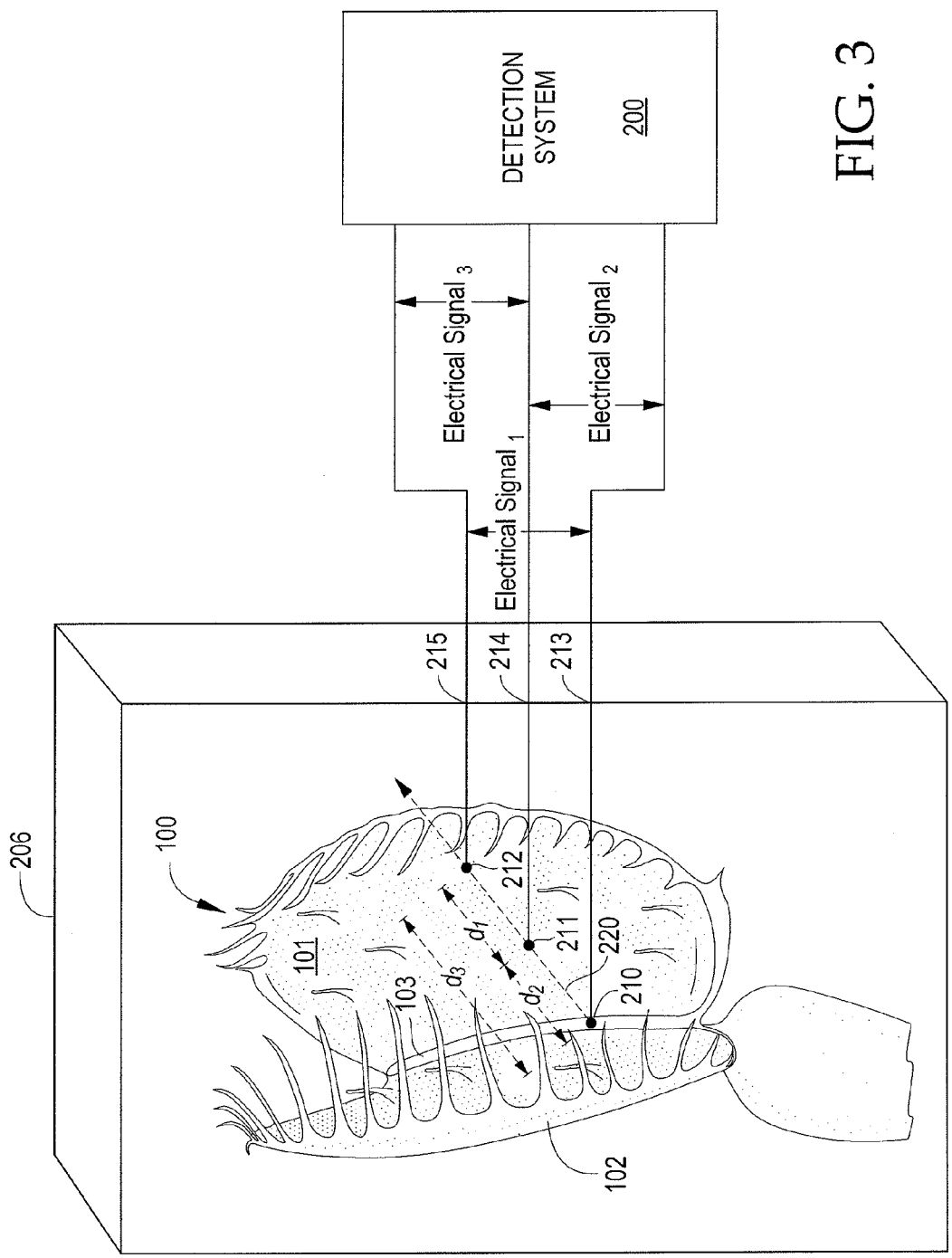
FIG. 3 depicts the bio-organism encapsulated in the Faraday as depicted in FIG. 2 communicatively coupled via three electrodes to a detection system in accordance with an embodiment of the present disclosure.

FIG. 3 is a diagram depicting an exemplary detection system 200 for detecting seismic activity with an electromagnetically sensitive bio-organism 100 in accordance with an embodiment of the present disclosure. The bio-organism 100 is enclosed in the Faraday cage 206 in order to isolate the bio-organism 100 from electrostatic energy (not shown).

Electrodes 210, 211, and 212 are placed on the bio-organism 100. In one embodiment, the electrodes 210, 211, and 212 are placed consecutively in a line represented by reference arrow 220 running over the lobe 101 from the midrib 103. The first electrode 210 is placed on the midrib 103 and is the common connection to the bio-organism 100. In addition, electrodes 211 and 212 are placed consecutively along the line represented by reference arrow 220.

Note that three electrodes 210-212 are shown on the bio-organism 100. Three electrodes 210-212 are shorn for exemplary purposes only. Additional electrodes may be used in other embodiments. For example, 4, 6, and/or 8 electrodes may be placed on the bio-organism 100, and action potentials of the bio-organism 100 may be measured at each location where an electrode is placed.

Further note that action potentials induced in the lobe 101 travel from electrode 212 to electrode 211, from electrode 211 to electrode 210, and from electrode 212 to electrode 210, from the lobe 101 to the midrib 103. Further note that electrode 210 is a distance $d_2$ from electrode 211 and a distance $d_3$ from electrode 212. Further, electrode 211 is a distance d1 from electrode 212. The relevance of the distances $d_1$, $d_2$, and $d_3$ are described further herein.

Each electrode 210-212 is electrically connected to the detection system 200 via one or more wires 213-215, respectively. Thus, action potentials induced in the lobe 101 between electrode 212 and 210 produce an Electrical Signal$_1$ across wires 213 and 215. In addition, action potentials induced in the lobe 101 between electrode 211 and 210 produce an Electrical Signal$_2$ across wires 214 and 213 and produce Electrical Signal$_3$ across wires 214 and 215.

Note that in one embodiment of the present disclosure the electrodes 210-212 are Silver/Silver Chloride (Ag/AgCl). Furthermore, the wires 213-215 may be silver wires.

The detection system 200 samples each of the Electrical Signals. In one embodiment, the detection system 200 samples the electrical signals over the wires 213-215 at 10 kilohertz (kHz), i.e., 10,000 samples per second. The detection system 200 determines, based upon the data obtained from sampling the electrical signals whether there is pre-earthquake seismic activity.

Note that the action potential measured by the electrodes 210-212 may vary depending upon the type of bio-organism 100 in which the electromagnetic waves 205 induce the action potential. In the example provided, a Venus flytrap is shown as an exemplary bio-organism 100. Through experimentation, a Venus flytrap has an action potential of approximately 0.1 Volts and a duration time of $1.0 \times 10^{-3}$–$1.4 \times 10^{-3}$ seconds. However, other bio-organisms, for example soybean plants or mimosas, may have different action potentials and durations, but may also be used to detect earthquakes in accordance with other embodiments of the present disclosure.

Figure 4:
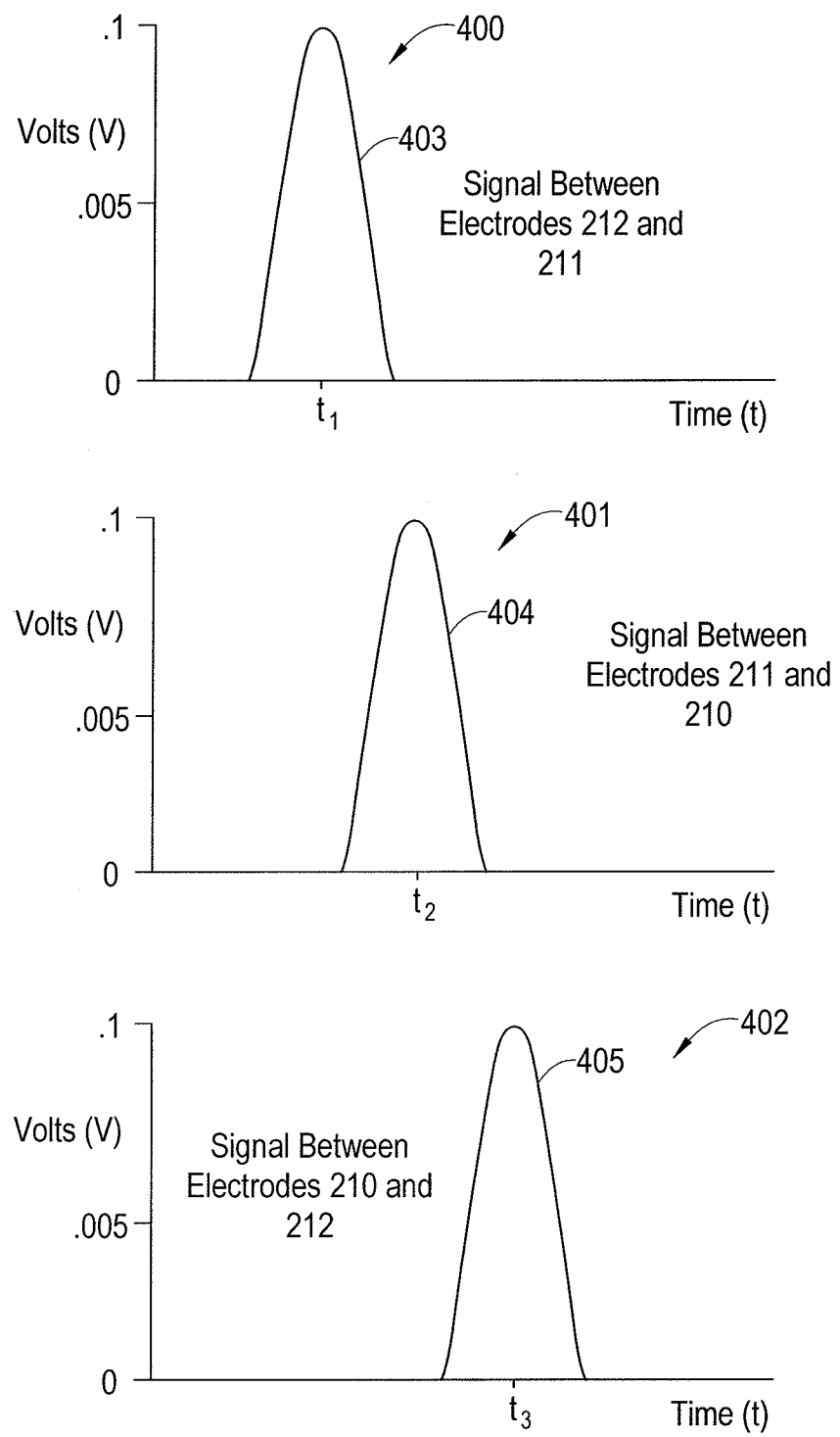
FIG. 4 depicts three graphs illustrating an electrical response of the bio-organism depicted in FIG. 3 to the electromagnetic waves, the bio-organism's response to which the electrodes detect and the detection system record.

FIG. 4 depicts three graphs 400-402 in accordance with an embodiment of the present disclosure. The graphs 400-402 each represent one electrical signal 403-405 that may be obtained from the wires 213-215 when an electromagnetic wave 205 (FIG. 2) produced from seismic activity induces a signal in the bio-organism 100 (FIG. 2).

In this regard, signal 403 represents voltage sampling over time between electrodes 212 and 211 when an electromagnetic wave 205 induces an action potential in the bio-organism 100. Note that the peak voltage read at $t=t_1$ is 0.1 Volts, which is the action potential of the Venus flytrap. As noted herein, this action potential may vary depending upon the type of bio-organism interfaced with the detection system 200. This action potential of 0.1 Volts translates to a peak amplitude in the signal traveling over the lobe 101 of 0.1 Volts, as illustrated.

Further, signal 404 represents voltage sampling over time between electrodes 211 and 210. Note that the peak voltage read at time $t=t_2$ is 0.1 Volts. In addition, signal 405 represents voltage sampling over time between electrodes 212 and 210. Again, the peak voltage read at time $t=t_3$ is 0.1 Volts.

As illustrated, the signals 403-405 occur at different times $t_1$-$t_3$, respectively. This difference in peak voltage times is because the action potential in the lobe 101 travels from electrode 212 to electrode 210 along line 220 toward the midrib 103 (FIG. 3). However, regardless of when the peak voltage occurs, an electromagnetic wave 205 from seismic activity induced in the bio-organism 100 generates at each electrode 210-212 substantially the same peak voltage value, which in the case of a Venus flytrap is 0.1 Volts.

Furthermore, an action potential induced in the bio-organism 100 by the electromagnetic wave 205 from seismic activity creates a constant speed of the action potential from electrode 212 to electrode 210. Whether the action potential is at a constant speed can be determined by calculating the speed of the action potential between electrodes 212 and 211, electrodes 211 and 210 and electrodes 212 and 210 to ensure that the speed is constant. If you do not have a constant speed between the electrodes 210-212, this is a false signal and no seismic activity is present. As an example, one or more electrodes may be faulty or the electromagnetic wave may be coming from another source other than seismic activity.

In order to calculate the speed between the electrodes, the electrodes 210-212 are placed on the bio-organism at known distances. As an example, the distance $d_3$ between electrode 210 and electrode 212 may be 2 centimeters (cm). Further, the distance $d_2$ between electrode 211 and electrode 210 may be 1 cm, and the distance $d_1$ between electrode 211 and electrode 212 may be 1 cm.

Speed of the action potential across the lobe 101 may be determined for each signal 403-405 based upon the sampled signals 403-405 and the distance placement of the electrodes 210-212. Note that the peak value of 0.1 Volts of signal 403 is detected at time t. The peak value of 0.1 Volts of signal 404 is detected at time $t_2$, and the peak value of 0.1 Volts of signal 405 is detected at time $t_3$.

Assume for exemplary purposes that the measured duration of the action potential across the lobe 101 is $1.0\times10^{-3}$ seconds. Further, for exemplary purposes assume that the measured durations of $t_2$-$t_1$ and $t_3$-$t_2$ are $5.0\times10^{-4}$. The speed between electrode 212 and 211 can be calculate with the following formula:

$$\text{Speed}_{212\ to\ 211} = \text{distance}(d_1)/\text{duration}(t_2-t_1)\sec$$

$$\text{Speed}_{212\ to\ 211} = 1\ cm/5.0\times10^{-4}\sec$$

$$\text{Speed}_{212\ to\ 211} = 2000\ cm/\sec$$

The speed between electrode 211 and 210 can be calculated with the following formula:

$$\text{Speed}_{211\ to\ 210} = \text{distance}(d_2)/\text{duration}(t_3-t_2)\sec$$

$$\text{Speed}_{211\ to\ 210} = 1\ cm/5.0\times10^{-4}\sec$$

$$\text{Speed}_{211\ to\ 210} = 2000\ cm/\sec$$

The speed between electrode 212 and 210 can be calculated with the following formula:

$$\text{Speed}_{212\ to\ 210} = \text{distance}(d_3)/\text{duration}(t_3-t_2)\sec$$

$$\text{Speed}_{212\ to\ 210} = 2\ cm/1.0\times10^{-3}\sec$$

$$\text{Speed}_{212\ to\ 210} = 2000\ cm/\sec.$$

In such an example, $\text{Speed}_{212\ to\ 211} = \text{Speed}_{211\ to\ 210} = \text{Speed}_{212\ to\ 210} = 2000$ cm/sec. Therefore, the action potential across the lobe 101 travels at a constant speed. When an electromagnetic wave 205 from seismic activity induces an action potential in the lobe 101, the action potential travels at a constant speed across the lobe 101.

Figure 5:
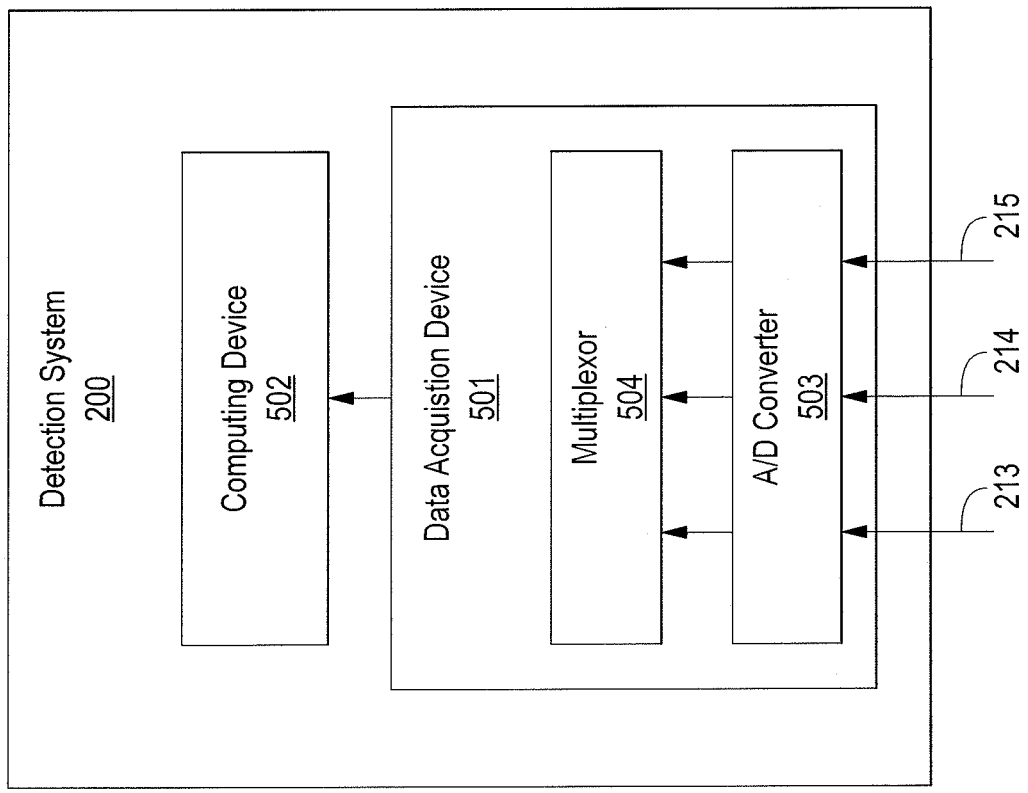
FIG. 5 is a block diagram depicting an exemplary detection system as depicted in FIG. 3.

FIG. 5 depicts an exemplary detection system 200. The exemplary detection system 200 comprises a data acquisition device 501 and a computing device 502. In one embodiment, the data acquisition device 501 comprises an analog-to-digital (A/D) converter 503 and a multiplexer 504.

The A/D converter 503 receives analog signals (not shown) via the wires 213-215 connected to the bio-organism 100 (FIG. 3). Note that the A/D converter 503 receives three wires 213-215 for receiving three signals. However, additional or fewer wires may be connected to the A/D converter 503 for receiving additional or fewer signals from additional or fewer electrodes, as described with reference to FIG. 7

In one embodiment of the present disclosure, only two electrodes 710, 711 are connected to the bio-organism 100 and via the wires 713, 714 to the detection system 200. Only Electrical Signal$_2$ would be generated. In such an embodiment, the detection system 200 is unable to determine a constant speed across the lobe 101. However, the detection system 200 can determine that the peak values contained in the Electrical Signal$_2$ remain at a constant value. The constant peak value in the Electrical Signal$_2$ may indicate seismic activity.

The A/D converter 503 converts the received analog signals to digital signals (not shown) indicative of the analog signals received and propagates the digital signals to the multiplexer 504. The multiplexer 504 combines the digital signals received into a single digital signal that contains data indicative of the three digital signals received from the A/D converter 503.

Note that the multiplexer 504 is shown diagrammatically as a component of the data acquisition device 501. However, the computing device 502 may comprise an electronic card (not shown) that receives multiple signals. Thus, the multiplexer could alternatively be shown as a component of the computing device 502.

The computing device 502 receives digital data (not shown) indicative of the analog signals received over the wires 213-215. Upon receipt, the computing device 502 determines, based upon analysis of the digital data, whether there is seismic activity.

In this regard, the computing device 502 determines if the action potential in the bio-organism 100 exhibits equal peak values, for example 0.1 Volts for a Venus flytrap, at each electrode 210-212 (FIG. 3). In addition, the computing device 502 determines if the action potential in the bio-organism 100 travels at a constant rate of speed across the lobe 101.

Figure 6:
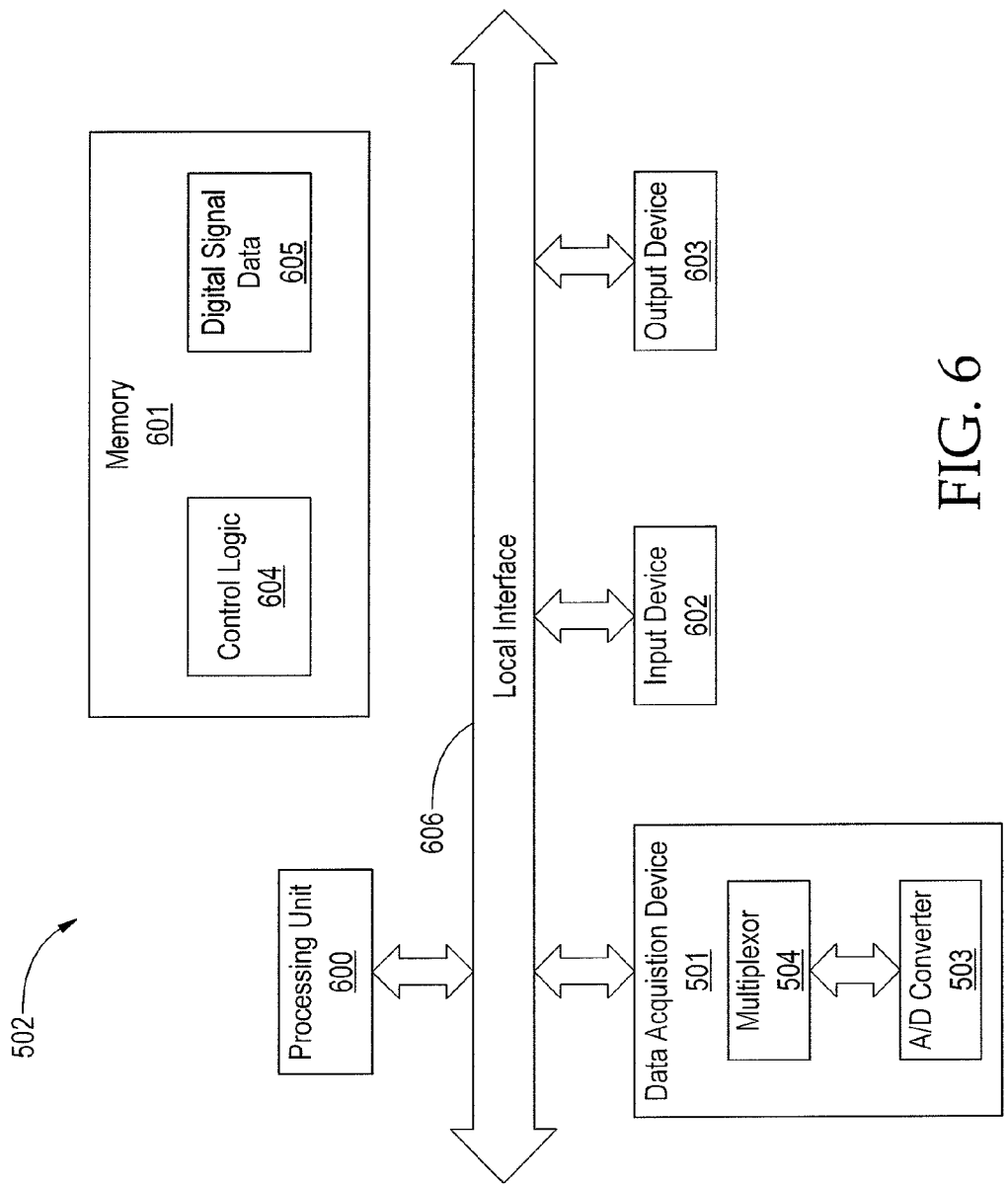
FIG. 6 is a block diagram depicting an exemplary computing device of the detection system depicted in FIG. 5.

FIG. 6 is a block diagram depicting an exemplary embodiment of the computing device 502 used to store and analyze data detected by the electromagnetically sensitive bio-organism 100 (FIG. 3). The computing device 502 generally comprises a processing unit 600, memory 601, an input device 602, and an output device 603.

The computing device 502 further comprises control logic 604 and digital signal data 605. The control logic 604 can be software, hardware, or a combination thereof. The exemplary computing device 502 shows the control logic 604 and the digital signal data 605 as stored in memory 601.

The processing unit 600 may be a digital processor or other type of circuitry configured to run the control logic 604 by processing and executing the instructions of the control logic 604. The processing unit 600 communicates with and drives the other elements within the computing device 502 via a local interface 606, which can include one or more buses. Furthermore, an input device 602, for example, a keyboard, a switch, a mouse, and/or other type of interface, can be used to input data from a user of the computing device 602, and an output device 603, for example a display device, can be used to output data to a user (not shown).

As described hereinabove, the computing device 502 receives data from the data acquisition device 501, which includes the A/D converter 503 and the multiplexer 504. In this regard, the A/D converter 503 converts the analog signals indicative of the response of the bio-organism 100 to electromagnetic waves 205 produced by seismic activity into digital signals. The multiplexer 504 combines the digital signals into a single signal for storage and analysis by the control logic 604.

An exemplary input device 602 may include, but is not limited to, a keyboard device, serial port, scanner, camera, microphone, or local access network connection. An exemplary output device 603 may include, but is not limited to, a monitor or video display.

As noted herein, control logic 604 and the digital signal data 605 are shown in FIG. 6 as software stored in memory 601. When stored in memory 601, the control logic 604 and the digital signal data 605 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device or propagation medium. Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

Upon receipt of digital data indicative of the analog signals received via the wires 213-215 (FIG. 3), the control logic 604 stores digital signal data 605 in memory 601 indicative of the analog signals received from the bio-organism. The control logic 604 then performs operations on the digital signal data 605 to determine whether seismic activity occurring indicates pre-earthquake conditions.

In this regard, the control logic 604 determines a peak value for each signal 403-405 received over the wires 213-215. The control logic 604 then determines if the peak values of the signals 403-405 are substantially equal. As described herein, if the peak values are substantially equal, this indicates pre-earthquake seismic activity.

Further, the control logic 604 determines the time at which the peak values were reached in each signal 403-405. The control logic 604 then determines, based upon the distance of the electrodes 210-212 one from the other and the time at which the peak values were reached, whether the action potential across the lobe 101 traveled at a constant speed. As described herein, if the speed of the action potential across the lobe 101 traveled at a constant speed, this also indicates pre-earthquake activity.

In one embodiment, the control logic 604 may generate a graphical user interface (GUI) (not shown). The GUI may display to the output device 603 a data and/or a graphical notification that the detection system 200 (FIGS. 3 & 5) has detected pre-earthquake activity. In addition, the GUI may display to the output device 603 graphs similar to those depicted in FIG. 4 so that a user (not shown) of the detection system 200 can discern visually whether pre-earthquake activity is occurring.

Figure 7:
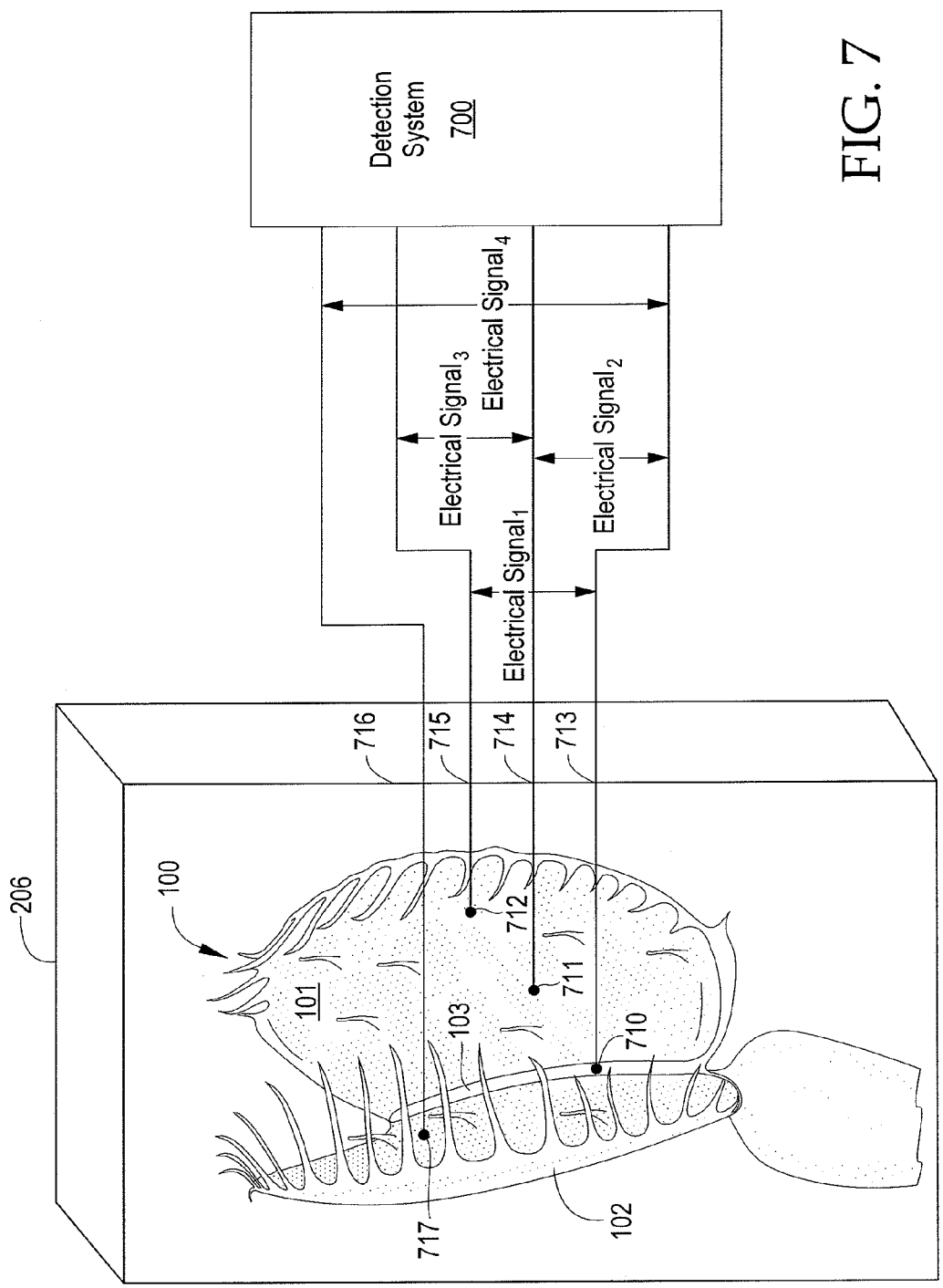
FIG. 7 depicts the bio-organism encapsulated in a Faraday cage communicatively coupled via four electrodes to a detection system in accordance with another embodiment of the present disclosure.

FIG. 7 depicts a detection system 700 in accordance with another embodiment of the present disclosure.

In such an embodiment, detection system 700 is substantially similar to the detection system 200. However, an additional electrode 717 is coupled to the bio-organism 100 on lobe 102. The additional electrode 717 is communicatively coupled to the detection system 700 via a wire 716. When an action potential is present in lobe 102 due to an electromagnetic wave 205 (FIG. 2), Electrical Signal$_4$ is transmitted to the detection system 700, in addition to Electrical Signals 1-3.

With the addition of the electrode 717, the detection system 700 may use the information contained in the Electrical Signal$_{1-4}$ to ensure reliability and integrity of the information contained in the Electrical Signal$_{1-4}$. In this regard, one of the electrodes 710-712, 716 may be generating a false signal (not shown), i.e., a signal that is not indicative of an electromagnetic wave 205 produced from seismic activity.

As an example, one of the electrodes 716 may be faulty or connected improperly to the bio-organism 100 and may be producing noise. In such an example, the detection system 700 can compare each of the generated Electrical Signals 13 with the Electrical Signal4 generated by the faulty electrode. If the comparison indicates that the Electrical Signals$_{1-3}$ are substantially similar to the graphs 400-402 (FIG. 4), but the Electrical Signal$_4$ is not, this indicates that there exists seismic activity and that there is incorrect information contained in Electrical Signal$_4$.

Figure 8:
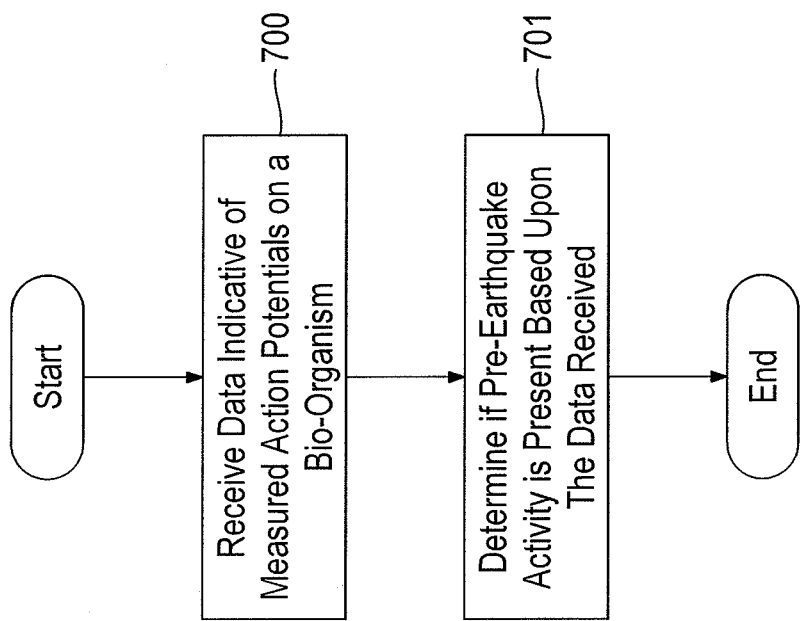
FIG. 8 is a flowchart depicting exemplary architecture and functionality of the detection system depicted in FIG. 5.

FIG. 8 is a flowchart depicting exemplary architecture and functionality of the detection system 200 (FIGS. 3 & 5).

In step 800, the detection system 200 receives data indicative of measured action potentials on a bio-organism 100 (FIGS. 1-3). In one embodiment, a plurality of electrodes 210-212 (FIG. 3) is placed on the bio-organism 100. As indicated herein, only three electrodes 210-212 are shown in FIG. 3. However, additional electrodes may be used in other embodiment of the present disclosure. The detection system 200 may comprise an A/D converter 503 (FIG. 5) that receives analog signals from wires 213-2 (FIG. 3) and converts the analog signals to digital data indicative of the action potentials measured by the electrodes 210-212.

In step 801, the detection system 200 determines whether the data received in step 700 indicates pre-earthquake seismic activity. In one embodiment of the present disclosure, the detection system 200 comprises a multiplexer 504 (FIG. 5). The multiplexer 504 converts the digital data indicative of the analog signals received via the wires 213-215 into a single signal (not shown). The control logic 604 (FIG. 6) receives the multiplexed signal and stores digital data indicative of each of the analog signals received as digital signal data 605 (FIG. 6) in memory 601. The control logic 604 then analyzes the stored digital signal data 604 to determine peak values in each of the analog signals received via the wires 213-215 and the speed at which the action potential detected by the electrodes 210-212 traveled across the lobe 101 of the bio-organism 100.

The invention claimed is:

1. A system comprising:
   at least two electrodes coupled to an electromagnetically sensitive bio-organism; and
   control logic configured to detect an action potential between the two electrodes based upon an electrochemical response in the bio-organism, the action potential produced by an electromagnetic wave, the control logic further configured to predict an earthquake based upon the action potential detected.

2. The system of claim 1, further comprising an analog-to-digital (A/D) converter electrically coupled to an output of each of the at least two electrodes.

3. The system of claim 1, wherein the control logic is further configured to analyze one or more peak values contained in a signal received from at least one of the electrodes and predict an earthquake, based upon the analysis.

4. The system of claim 3, wherein the control logic is further configured to predict the earthquake if the peak values are substantially equivalent.

5. The system of claim 1, wherein a first, second, and third electrode are coupled to the bio-organism.

6. The system of claim 5, wherein the control logic compares a signal produced by the first electrode to signals produced by the second and third electrodes.

7. The system of claim 6, wherein the control logic is further configured to determine, based upon the signals received, whether the first, second, or third electrode is working improperly.

8. A method, comprising:
   detecting a first and second signal from a first and second electrode communicatively coupled to an electromagnetically-sensitive bio-organism;
   calculating an action potential based upon the signals, the action potential based upon an electrochemical response in the bio-organism; and
   predicting an earthquake based upon the calculated action potential.

9. The system of method 8, further comprising converting the first and second signal into digital data.

10. The method of claim 1, further comprising analyzing one or more peak values contained in the received signals.

11. The method of claim 10, further comprising predicting the based upon the analysis.

12. The method of claim 1, further comprising receiving a first, second, and third signal from at least three electrodes coupled to the bio-organism.

13. The method of claim 12, comparing the first signal to the second and third signals.

14. The system of claim 13, further comprising determining, based upon the signals, whether the first, second, or third electrode is working improperly.

15. A system, comprising:
- at least two electrodes coupled to an electromagnetically sensitive bio-organism; and
- control logic configured to predict an earthquake based upon signals produced by the electrodes in response to an electromagnetic signal, the signals based upon an electrochemical response in the bio-organism.

* * * * *